(12) United States Patent
Aiba

(10) Patent No.: US 11,181,714 B2
(45) Date of Patent: Nov. 23, 2021

(54) LENS UNIT

(71) Applicant: FUJIFILM Corporation, Tokyo (JP)

(72) Inventor: Daigo Aiba, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 105 days.

(21) Appl. No.: 16/825,989

(22) Filed: Mar. 20, 2020

(65) Prior Publication Data

US 2020/0218031 A1 Jul. 9, 2020

Related U.S. Application Data

(63) Continuation of application No. PCT/JP2018/034414, filed on Sep. 18, 2018.

(30) Foreign Application Priority Data

Sep. 22, 2017 (JP) .............................. JP2017-182282

(51) Int. Cl.
*G02B 7/02* (2021.01)
*G02B 7/04* (2021.01)

(52) U.S. Cl.
CPC ................ *G02B 7/04* (2013.01); *G02B 7/021* (2013.01)

(58) Field of Classification Search
CPC .......... G02B 7/04; G02B 7/021; G02B 7/026; G02B 7/022; G02B 7/10

(Continued)

(56) References Cited

U.S. PATENT DOCUMENTS

| 2002/0093745 | A1 | 7/2002 | Takanashi et al. |
| 2004/0051968 | A1* | 3/2004 | Nomura ................... G02B 7/08 359/701 |

(Continued)

FOREIGN PATENT DOCUMENTS

| CN | 1854785 A | 11/2006 |
| CN | 201170807 Y | 12/2008 |

(Continued)

OTHER PUBLICATIONS

International Search Report issued in PCT/JP2018/034414; dated Dec. 25, 2018.

(Continued)

*Primary Examiner* — Mahidere S Sahle
(74) *Attorney, Agent, or Firm* — Studebaker & Brackett PC

(57) ABSTRACT

A focus mechanism includes an inner barrel and an outer barrel that holds the inner barrel to allow the inner barrel to move along an optical axis. An inner peripheral surface of the outer barrel includes a medium-diameter portion having an inner diameter and a small-diameter portion having an inner diameter. The small-diameter portion is continuous to the medium-diameter portion, is positioned on a back side of the medium-diameter portion in an insertion direction ID where the inner barrel is inserted into the outer barrel. The small-diameter portion has an inner diameter that allows an X-ring absorbing the rattling of the inner barrel to be in pressure contact with the small-diameter portion in a case where the inner barrel is inserted into the outer barrel in a state where the X-ring is fitted to a groove. A boundary portion between the medium-diameter portion and the small-diameter portion is disposed at a position closer to a back side than an opening edge, which is close to the back side, of a pin-movement opening.

9 Claims, 10 Drawing Sheets

(58) Field of Classification Search
    USPC .................................. 359/694–706, 822–826
    See application file for complete search history.

(56)  References Cited

U.S. PATENT DOCUMENTS

2006/0256455 A1    11/2006  Nishimoto
2017/0102554 A1     4/2017  Yagi

FOREIGN PATENT DOCUMENTS

| CN | 204556937 U | 8/2015 |
|---|---|---|
| CN | 106462035 A | 2/2017 |
| JP | S60-168109 A | 8/1985 |
| JP | S60-140018 U | 9/1985 |
| JP | S61-97610 A | 5/1986 |
| JP | S62-034111 A | 2/1987 |
| JP | H11-352377 A | 12/1999 |
| JP | 2002-090610 A | 3/2002 |
| JP | 2002-162556 A | 6/2002 |
| JP | 2010-271525 A | 12/2010 |

OTHER PUBLICATIONS

International Preliminary Report On Patentability and Written Opinion issued in PCT/JP2018/034414; dated Mar. 24, 2020.
An Office Action mailed by China National Intellectual Property Administration dated Jun. 16, 2021, which corresponds to Chinese Patent Application No. 201880061397.1 and is related to U.S. Appl. No. 16/825,989; with English language translation.

* cited by examiner

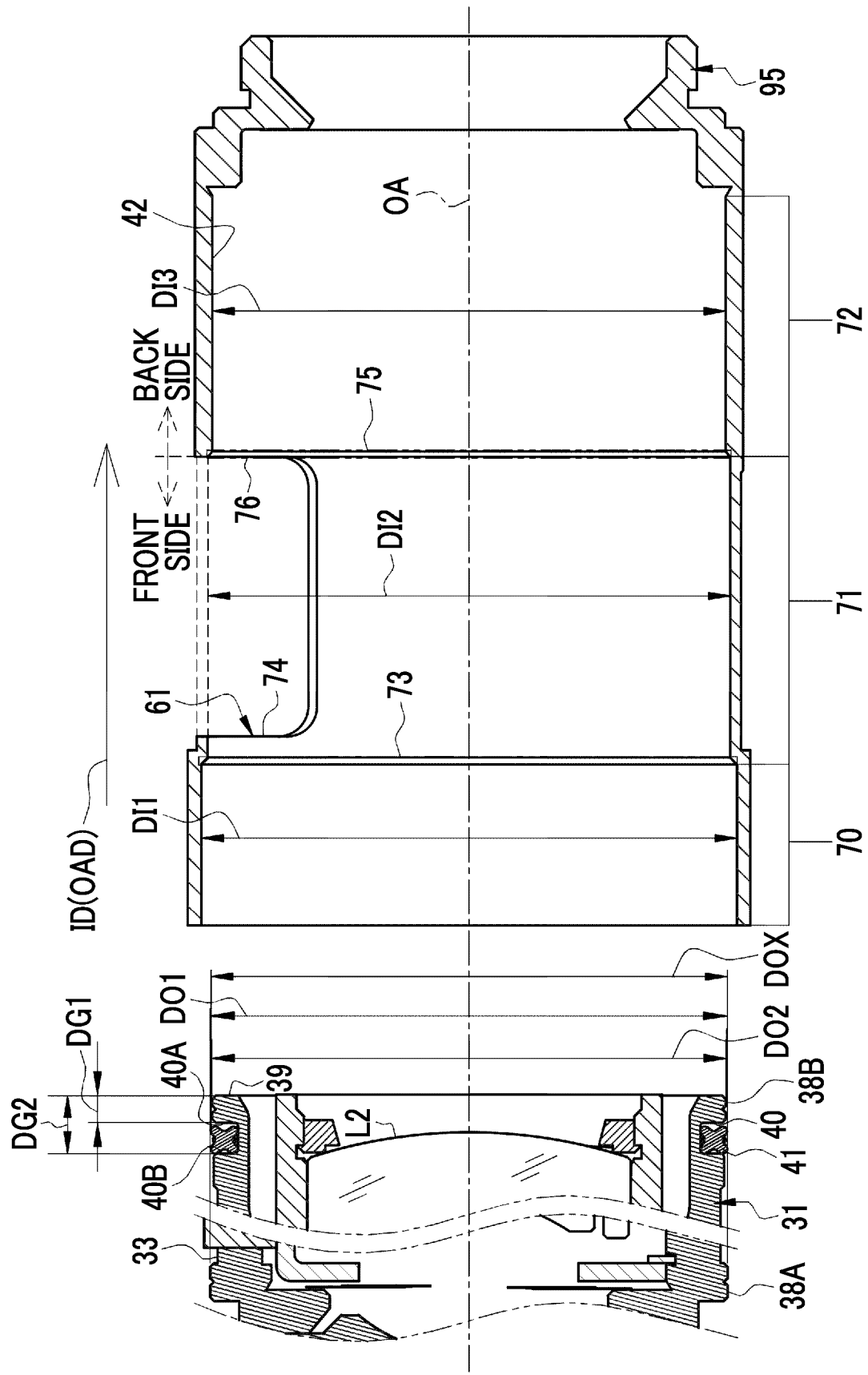

LENS UNIT

CROSS-REFERENCE TO RELATED APPLICATIONS

This application is a Continuation of PCT International Application No. PCT/JP2018/034414 filed on 18 Sep. 2018, which claims priority under 35 U.S.C § 119(a) to Japanese Patent Application No. 2017-182282 filed on 22 Sep. 2017. The above application is hereby expressly incorporated by reference, in its entirety, into the present application.

BACKGROUND OF THE INVENTION

1. Field of the Invention

The present invention relates to a lens unit.

2. Description of the Related Art

A lens unit that includes a focus mechanism comprising a plurality of lenses and focusing on a specific subject is known. The focus mechanism includes an inner barrel, an outer barrel, and a focus ring. The inner barrel holds the plurality of lenses. The inner barrel is inserted into the outer barrel, and the outer barrel holds the inner barrel to allow the inner barrel to move along the optical axis of the lenses. The focus ring is rotationally operated by a user in a case where the inner barrel is to be moved relative to the outer barrel along the optical axis.

The outer barrel is formed to have an inner diameter equal to the outer diameter of the inner barrel as much as possible so that the inner barrel is inserted with no gap. However, there is a case where a gap is formed between the outer peripheral surface of the inner barrel and the inner peripheral surface of the outer barrel due to various factors, such as the variation of machining accuracy. Further, there is a case where this gap causes the inner barrel to rattle from the outer barrel and causes the optical axis to be shifted. In a case where the lens unit is used for, for example, a digital camera, a subject image formed on an image sensor is also shifted due to the shift of the optical axis.

A lens unit, which is provided with an elastic ring (O-ring) for absorbing the rattling of the inner barrel, is disclosed in the related art of JP1987-034111A (JP-S62-034111A). The elastic ring is fitted to an annular groove that is formed on the outer peripheral surface of the inner barrel along the circumferential direction. In a case where the inner barrel is assembled with the outer barrel, the elastic ring is in pressure contact with the inner peripheral surface of the outer barrel. Accordingly, the rattling of the inner barrel caused by a gap between the outer peripheral surface of the inner barrel and the inner peripheral surface of the outer barrel is absorbed.

SUMMARY OF THE INVENTION

Here, there is a case where the outer barrel is machined to have an inner diameter changed in stages so that the insertion of the inner barrel is smoothly guided all the way. For example, the inner peripheral surface of the outer barrel is provided with a large-diameter portion that has an inner diameter larger than the outer diameter of the inner barrel and a small-diameter portion that has an inner diameter allowing the elastic ring to be in pressure contact with the small-diameter portion. The small-diameter portion is continuous to the large-diameter portion, and is positioned on the back side of the large-diameter portion in an insertion direction where the inner barrel is inserted into the outer barrel.

Further, the lens unit is provided with a stop mechanism. The stop mechanism includes a plurality of stop leaf blades, an operation pin, and an iris ring. The stop leaf blades form a substantially circular stop aperture, and change the size of the stop aperture to limit the amount of light. The operation pin is used to adjust the opening of the stop aperture, protrudes outward from the stop leaf blades, and is connected to the iris ring. In a case where the iris ring is rotationally operated by a user, the operation pin is moved in the circumferential direction. Accordingly, the stop aperture is opened or closed.

In the case of the lens unit comprising the stop mechanism, a pin-movement opening allowing the movement of the operation pin is formed in the outer barrel. More specifically, the pin-movement opening is formed in a substantially rectangular shape in plan view, and has predetermined widths in the circumferential direction and an optical axis direction to allow the movement of the operation pin in the circumferential direction, which is caused by a user's operation, and the movement of the operation pin along the optical axis which is caused by the movement of the inner barrel along the optical axis performed by a focus mechanism.

A case where the inner peripheral surface of the outer barrel is formed of a large-diameter portion and a small-diameter portion and a pin-movement opening is formed in the outer barrel is considered in the related art of JP1987-034111A (JP-S62-034111A). In this case, depending on a positional relationship between the pin-movement opening and a boundary portion between the large-diameter portion and the small-diameter portion, a situation where the elastic ring protrudes from the pin-movement opening and is taken out of the groove and the inner barrel cannot be assembled with the outer barrel may occur in a case where the inner barrel is inserted into the outer barrel in a state where the elastic ring is fitted to the groove at the time of assembling the inner barrel with the outer barrel.

In more detail, in a case where the inner barrel enters the small-diameter portion from the large-diameter portion, the elastic ring receives pressure from the small-diameter portion and contracts. However, in a case where the pin-movement opening is provided at this position, the pin-movement opening serves as a space through which the elastic ring under pressure escapes. Accordingly, the elastic ring protrudes from the pin-movement opening and is taken out of the groove.

An object of the invention is to provide a lens unit that absorbs the shift of an optical axis occurring due to the rattling of an inner barrel, which is caused by a gap between an outer barrel and the inner barrel, by an elastic ring and allows the inner barrel to be easily assembled with the outer barrel.

To solve the problem, a lens unit according to an aspect of the invention comprises a focus mechanism, a stop mechanism, an annular groove, an elastic ring, and a pin-movement opening. The focus mechanism includes an inner barrel that holds a plurality of lenses, and an outer barrel into which the inner barrel is inserted and which holds the inner barrel to allow the inner barrel to move along an optical axis of the lenses. The stop mechanism includes a stop leaf blade that limits the amount of light, and an operation pin that protrudes outward from the stop leaf blade and is operated in a circumferential direction to adjust an opening of the stop leaf blade. The annular groove is formed on an outer peripheral surface of the inner barrel along the circumferential direction. The elastic ring is fitted to the groove, and is in pressure contact with an inner peripheral surface of the outer barrel and absorbs rattling of the inner barrel caused by a gap between the outer peripheral surface of the inner barrel and the inner peripheral surface of the outer barrel in a case where the inner barrel is assembled with the outer barrel. The pin-movement opening is formed in the outer barrel, and has a size allowing movement of the operation pin in the circumferential direction and movement of the operation pin along the optical axis caused by movement of the inner barrel along the optical axis. The inner peripheral surface of the outer barrel includes at least a first large-diameter portion that has an inner diameter larger than an outer diameter of the inner barrel, and a first small-diameter portion that is continuous to the first large-diameter portion, is positioned on a back side of the first large-diameter portion in an insertion direction where the inner barrel is inserted into the outer barrel, and has an inner diameter allowing the elastic ring to be in pressure contact with the first small-diameter portion in a case where the inner barrel is inserted into the outer barrel in a state where the elastic ring is fitted to the groove; and a boundary portion between the first large-diameter portion and the first small-diameter portion is disposed at the same position as an opening edge, which is close to the back side, of the pin-movement opening or a position closer to the back side than the opening edge.

It is preferable that the inner peripheral surface of the outer barrel includes a second large-diameter portion having an inner diameter larger than the outer diameter of the inner barrel, and a second small-diameter portion continuous to the second large-diameter portion, positioned on the back side of the second large-diameter portion, and having an inner diameter smaller than the inner diameter of the second large-diameter portion, and an inclined surface narrowed toward the back side is formed at a boundary portion between the second large-diameter portion and the second small-diameter portion.

Further, a lens unit according to another aspect of the invention comprises a focus mechanism, a stop mechanism, an annular groove, an elastic ring, and a pin-movement opening. The focus mechanism includes an inner barrel that holds a plurality of lenses, and an outer barrel into which the inner barrel is inserted and which holds the inner barrel to allow the inner barrel to move along an optical axis of the lenses. The stop mechanism includes a stop leaf blade that limits the amount of light, and an operation pin that protrudes outward from the stop leaf blade and is operated in a circumferential direction to adjust an opening of the stop leaf blade. The annular groove is formed on an outer peripheral surface of the inner barrel along the circumferential direction. The elastic ring is fitted to the groove, and is in pressure contact with an inner peripheral surface of the outer barrel and absorbs rattling of the inner barrel caused by a gap between the outer peripheral surface of the inner barrel and the inner peripheral surface of the outer barrel in a case where the inner barrel is assembled with the outer barrel. The pin-movement opening is formed in the outer barrel, and has a size allowing movement of the operation pin in the circumferential direction and movement of the operation pin along the optical axis caused by movement of the inner barrel along the optical axis. The inner peripheral surface of the outer barrel includes a second large-diameter portion that has an inner diameter larger than an outer diameter of the inner barrel, and a second small-diameter portion that is continuous to the second large-diameter portion, is positioned on the back side of the second large-diameter portion, and has an inner diameter smaller than the inner diameter of the second large-diameter portion; and an inclined surface narrowed toward the back side is formed at a boundary portion between the second large-diameter portion and the second small-diameter portion.

It is preferable that the groove is formed at a position where a distance in the insertion direction between an end portion of the inner barrel and a side wall, which is close to the back side, of the groove is 1 mm or more and a distance between the end portion and a side wall of the groove opposite to the side wall close to the back side is 5 mm or less.

It is preferable that the elastic ring is an X-ring of which a cross-sectional shape taken in a direction orthogonal to the circumferential direction is an X shape. Further, it is preferable that the lens unit is used for a machine vision camera.

According to the invention, since the boundary portion between the first large-diameter portion and the first small-diameter portion of the inner peripheral surface of the outer barrel is disposed at the same position as an opening edge, which is close to the back side in the insertion direction where the inner barrel is inserted into the outer barrel, of the pin-movement opening or a position closer to the back side than the opening edge. Accordingly, a case where the elastic ring protrudes from the pin-movement opening and is taken out of the groove is prevented. Therefore, it is possible to provide a lens unit that absorbs the shift of the optical axis occurring due to the rattling of the inner barrel, which is caused by a gap between the outer barrel and the inner barrel, by the elastic ring and allows the inner barrel to be easily assembled with the outer barrel.

BRIEF DESCRIPTION OF THE DRAWINGS

FIG. 8A shows a state where the inner barrel does not yet pass through the boundary portion,
and FIG. 8B shows a state where the inner barrel has passed through the boundary portion.
FIG. 10A shows a state where the inner barrel does not yet pass through the boundary portion,
and FIG. 10B shows a state where the inner barrel has passed through the boundary portion.

FIG. 11 is a diagram showing an outer barrel of which a boundary portion between a medium-diameter portion and a small-diameter portion is disposed at the same position as an opening edge, which is close to a back side, of a pin-movement opening.

DESCRIPTION OF THE PREFERRED EMBODIMENTS

First Embodiment

Figure 1:
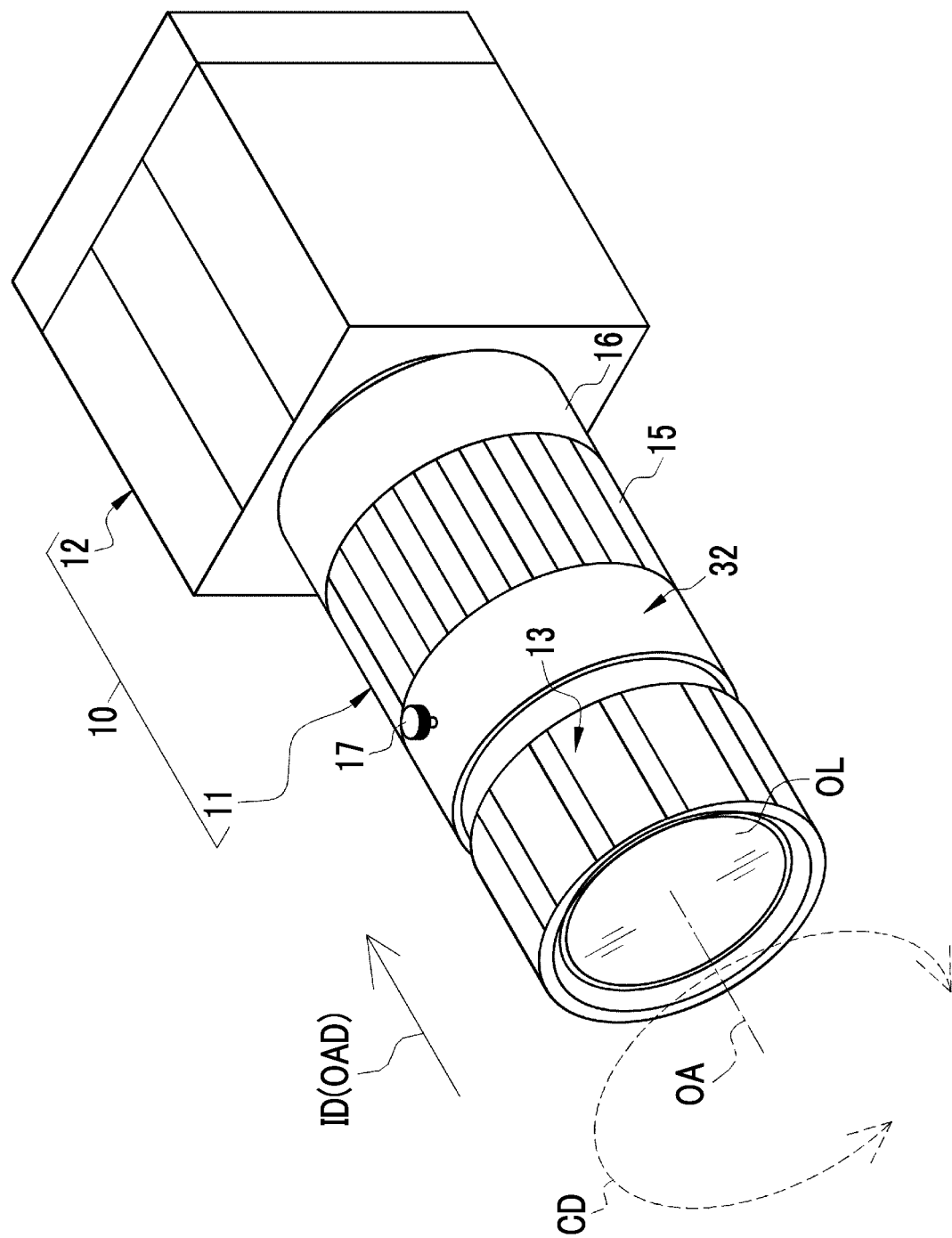
FIG. 1 is a perspective view of a machine vision camera.

In FIG. 1, a machine vision camera 10 is used for factory automation, such as the inspection of products in the production line of a factory, and includes a lens unit 11 and a camera body 12. The lens unit 11 is made of a metal material, which is light and is to be easily machined, such as an aluminum alloy, and is attachably and detachably mounted on the camera body 12. The lens unit 11 captures a subject image through an objective lens OL. The lens unit 11 forms the subject image on the imaging surface of an image sensor (not shown), such as a charge coupled device (CCD) or a complementary metal oxide semiconductor (CMOS), which is built in the camera body 12.

The image sensor outputs imaging signals that represent the subject image. The camera body 12 includes a transmission unit (not shown) that transmits the imaging signals to an information processing device, such as a personal computer. The transmission unit is, for example, a universal serial bus (USB) interface or a Gigabit local area network (LAN) standard interface. The information processing device analyzes imaging signals, and determines whether a product is defective or not according to the results of the analysis.

The lens unit 11 includes a focus ring 13, an iris ring 15, and a retaining part 16 that are annular members. The focus ring 13 and the iris ring 15 are rotationally operated by a user along a circumferential direction CD indicated by a broken line. The focus ring 13 is rotationally operated to perform focus adjustment for focusing on a specific subject. The iris ring 15 is rotationally operated to adjust the opening of a stop aperture where stop leaf blades 51 (see FIG. 2) are formed.

Figure 2:
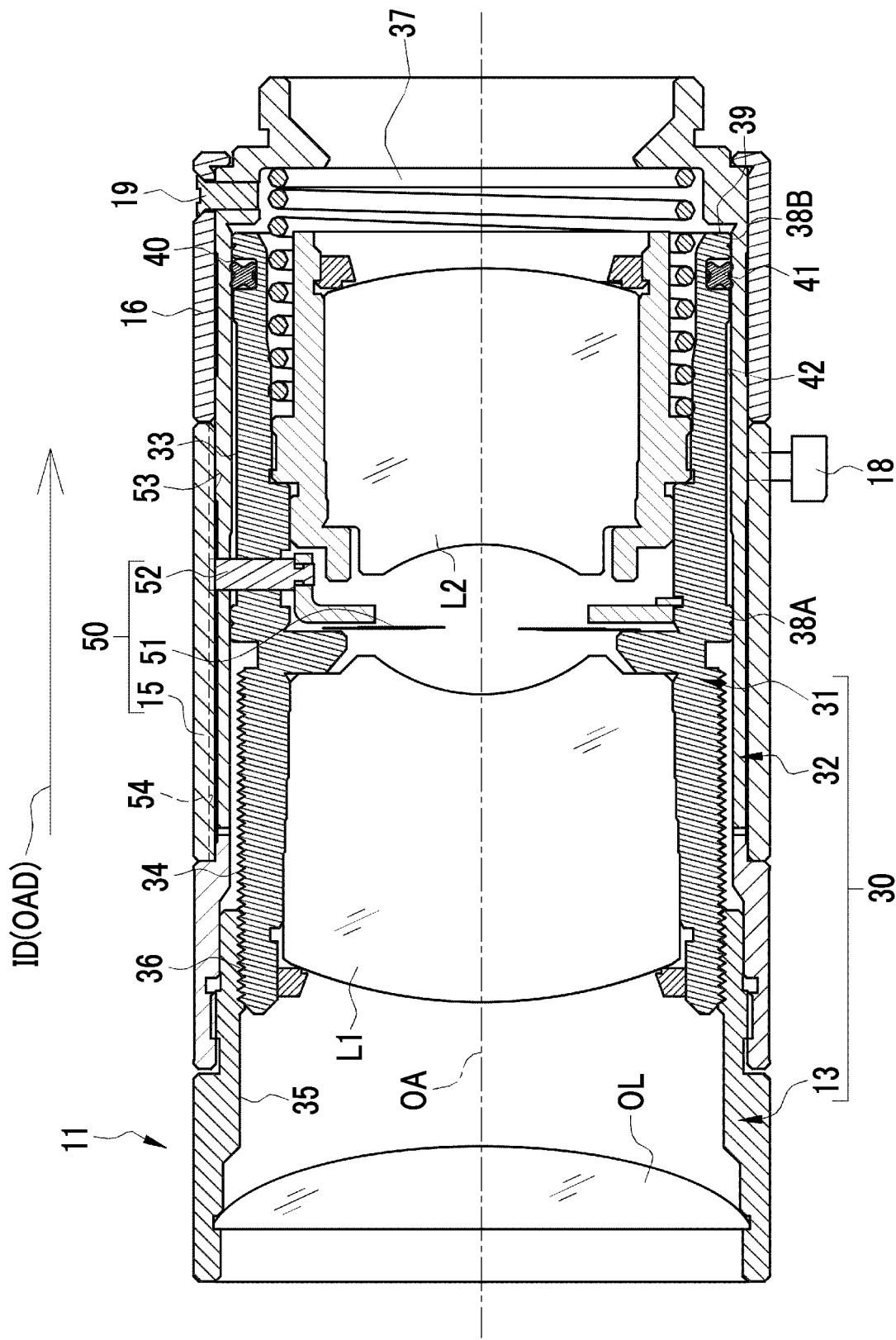
FIG. 2 is a cross-sectional view of a lens unit.

The focus ring 13 and the iris ring 15 are rotatable with respect to an outer barrel 32 (also see FIG. 2). The retaining part 16 prevents the iris ring 15 from being separated.

A fixing screw 17 is mounted on the outer barrel 32, a fixing screw 18 (see FIG. 2) is mounted on the iris ring 15, and a fixing screw 19 (see FIG. 2) is mounted on the retaining part 16. More specifically, threaded holes with which the fixing screws 17 and 18 are to be threadedly engaged and which penetrate are formed in the outer barrel 32 and the iris ring 15, respectively, and an insertion hole into which the fixing screw 19 is to be inserted is formed in the retaining part 16.

In a case where the fixing screw 17 of the outer barrel 32 is tightened, the distal end of the fixing screw 17 is in contact with the focus ring 13. Accordingly, the focus ring 13 is fixed to the outer barrel 32. Likewise, the distal end of the fixing screw 18 of the iris ring 15 is in contact with the outer barrel 32 (see FIG. 2), so that the iris ring 15 is fixed to the outer barrel 32.

The fixing screw 19 of the retaining part 16 is threadedly engaged with a threaded hole formed in the outer barrel 32. In a case where the fixing screw 19 is tightened, the retaining part 16 is fixed to the outer barrel 32.

The fixing screw 17 is loosened at the time of the focus adjustment to allow the rotation of the focus ring 13 in the circumferential direction CD. The fixing screw 17 is tightened after the focus adjustment, so that the focus ring 13 is fixed at a position where a focus has been adjusted. The fixing screw 18 is loosened at the time of the adjustment of the opening of the stop aperture to allow the rotation of the iris ring 15 along the circumferential direction CD. The fixing screw 18 is tightened after the adjustment of the opening of the stop aperture, so that the iris ring 15 is fixed at a position where the opening of the stop aperture has been adjusted. The fixing screw 19 is tightened after the assembly of the retaining part 16 to fix the retaining part 16.

In FIG. 2, the lens unit 11 comprises a focus mechanism 30. The focus mechanism 30 includes an inner barrel 31 and the outer barrel 32 in addition to the above-mentioned focus ring 13. The inner barrel 31 holds lenses L1 and L2. The inner barrel 31 is inserted into the outer barrel 32. More specifically, the inner barrel 31 is inserted into the outer barrel 32 along an arrow direction ID that is shown by a solid line and is parallel to an optical axis OA (shown by a one-dot chain line) of the objective lens OL and the lenses L1 and L2. This arrow direction ID is an insertion direction. Further, since the insertion direction ID is parallel to the optical axis OA, the insertion direction ID is also an optical axis direction OAD. The outer barrel 32 holds the inner barrel 31 to allow the inner barrel 31 to move along the optical axis OA. Although not shown for the simplification of the drawing, each of the lenses L1 and L2 is actually composed of a plurality of lenses.

Male threads 34 are formed on the almost half of an outer peripheral surface 33 of the inner barrel 31 that is close to a front side in the insertion direction ID. The male threads 34 are threadedly engaged with female threads 36 formed on an inner peripheral surface 35 of the focus ring 13. In a case where the focus ring 13 is rotated, the inner barrel 31 is moved relative to the focus ring 13 along the optical axis OA by the action of the male threads 34 and the female threads 36 since the position of the focus ring 13 in the optical axis direction OAD is fixed.

A coil spring 37 is inserted into a portion of the inner barrel 31 opposite to the focus ring 13. One end of the coil spring 37 is in contact with the inner barrel 31 and the other end thereof is in contact with the outer barrel 32. The coil spring 37 biases the inner barrel 31 against the outer barrel 32 in a direction opposite to the insertion direction ID. The inner barrel 31 is pushed to the focus ring 13 by the biasing of the coil spring 37, so that rattling between the male threads 34 and the female threads 36 are eliminated. The inner barrel 31 is positioned in the optical axis direction OAD in this way.

A first same-diameter portion 38A and a second same-diameter portion 38B, which have substantially the same outer diameter as the inner diameter of the outer barrel 32, are provided on the outer peripheral surface 33 of the inner barrel 31. Each of these same-diameter portions 38A and 38B is formed in an annular shape along the circumferential direction CD. The first same-diameter portion 38A is disposed at the middle portion of the inner barrel 31 between the lenses L1 and L2, and the second same-diameter portion 38B is disposed at an end portion 39, which is close to the back side, of the inner barrel 31 in the insertion direction ID.

Further, an annular groove 40 is formed on the outer peripheral surface 33 of the inner barrel 31 along the circumferential direction CD. The groove 40 is formed at a position adjacent to the second same-diameter portion 38B on the front side of the second same-diameter portion 38B in the insertion direction ID. An X-ring 41 as an elastic ring is fitted to the groove 40. The inner diameter of the X-ring 41 in a natural state where an external force is not applied is slightly larger than the diameter of the groove 40, that is, is substantially equal to the diameter of the groove 40. The cross-sectional shape of the X-ring 41 taken in a direction orthogonal to the circumferential direction CD is an X shape. The inner barrel 31 is inserted into the outer barrel 32 in a state where the X-ring 41 is fitted to the groove 40.

The outer diameter of each of the same-diameter portions 38A and 38B is substantially equal to the inner diameter of the outer barrel 32. More exactly, the outer diameter of each of the same-diameter portions 38A and 38B is slightly smaller than the inner diameter of the outer barrel 32. For this reason, since a small gap is formed between the outer peripheral surface 33 of the inner barrel 31 and an inner peripheral surface 42 of the outer barrel 32, the inner barrel 31 rattles from the outer barrel 32 in this state. However, in this embodiment, the X-ring 41 is in pressure contact with the inner peripheral surface 42 of the outer barrel 32 in a state of FIG. 2 where the inner barrel 31 is assembled with the outer barrel 32. Accordingly, the rattling of the inner barrel 31 caused by the gap between the outer peripheral surface 33 of the inner barrel 31 and the inner peripheral surface 42 of the outer barrel 32 is absorbed.

The lens unit 11 also comprises a stop mechanism 50. The stop mechanism 50 is disposed at the middle portion of the inner barrel 31 between the lenses L1 and L2. The stop mechanism 50 includes a plurality of stop leaf blades 51 and an operation pin 52 in addition to the above-mentioned iris ring 15. The stop leaf blades 51 form a substantially circular stop aperture as well known. The stop leaf blades 51 change the size of the stop aperture to limit the amount of incident light. The operation pin 52 is used to adjust the opening of the stop aperture. The operation pin 52 is a cylindrical protrusion that protrudes outward from the stop leaf blades 51.

The distal end of the operation pin 52 is engaged with a guide groove 54 formed on an inner peripheral surface 53 of the iris ring 15. Accordingly, the operation pin 52 and the iris ring 15 are connected to each other. The guide groove 54 is linearly formed along the optical axis OA. Further, the guide groove 54 has a width slightly larger than the diameter of the operation pin 52 in the circumferential direction CD. The guide groove 54 guides the movement of the operation pin 52 along the optical axis OA that is caused by the movement of the inner barrel 31 along the optical axis OA.

Figure 3:
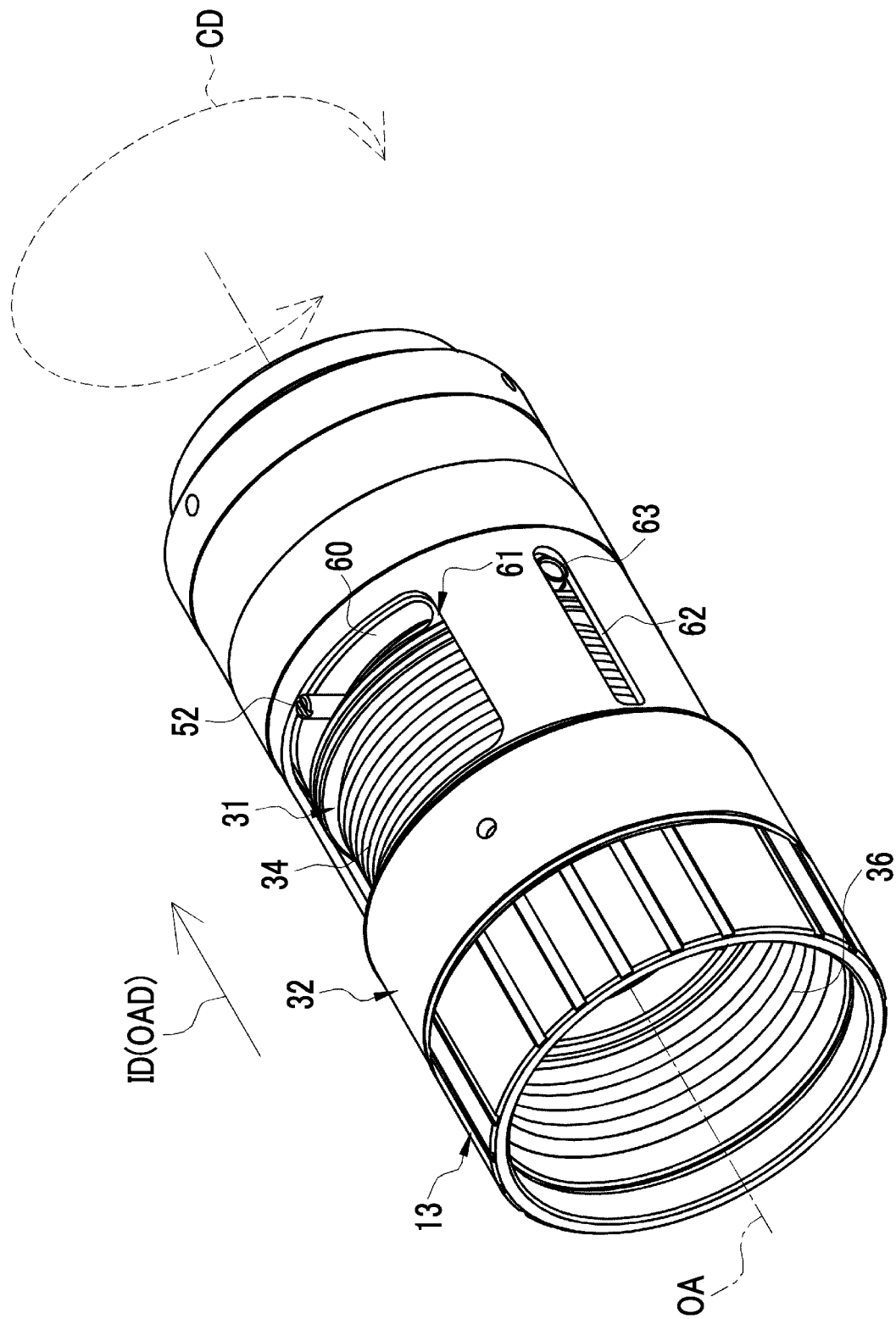
FIG. 3 is a perspective view showing main parts of the lens unit.
Figure 4:
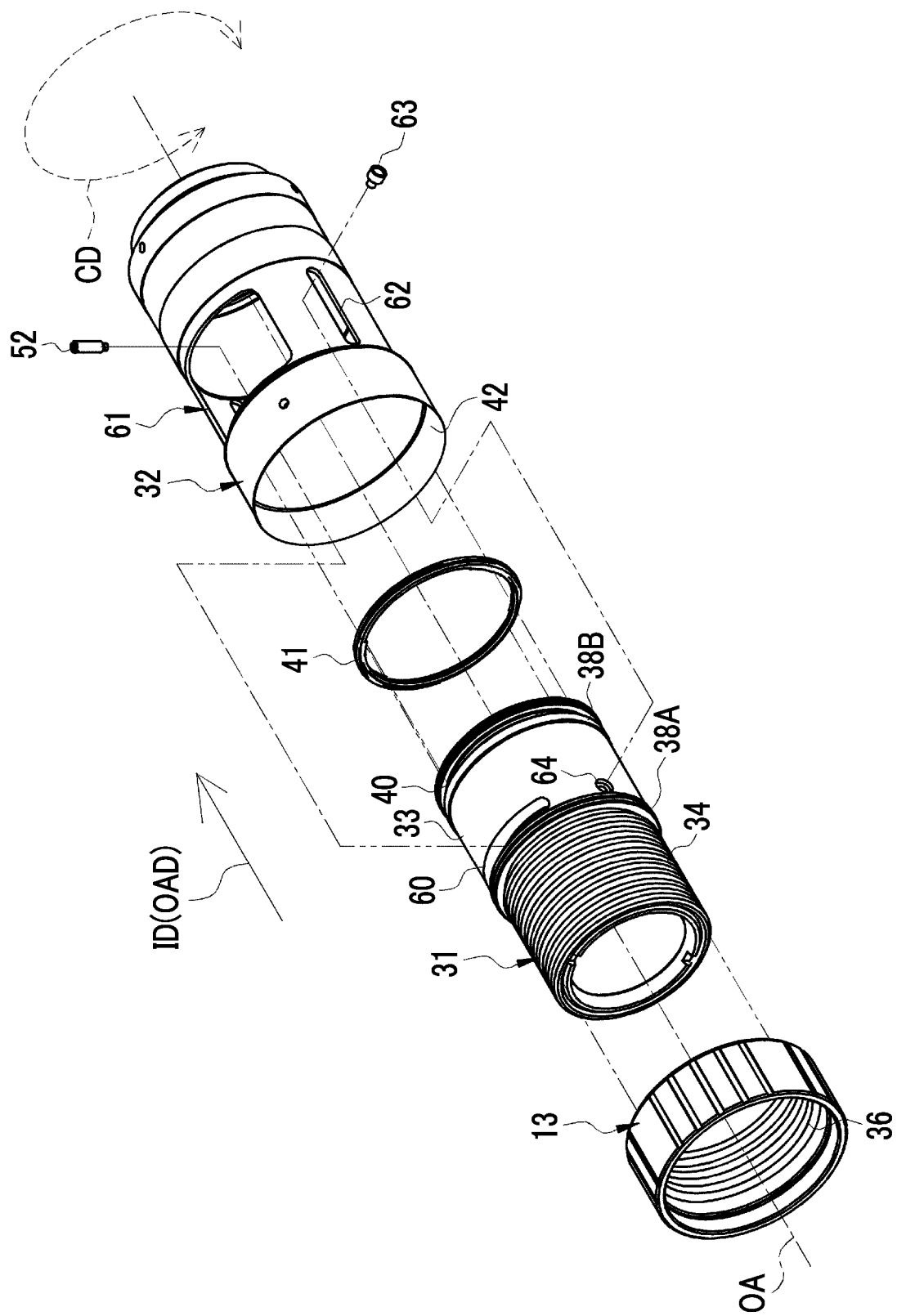
FIG. 4 is an exploded perspective view showing main parts of the lens unit.

In FIGS. 3 and 4, a guide hole 60 is formed in the inner barrel 31 so as to extend along the circumferential direction CD. The guide hole 60 has a length corresponding to the moving range of the operation pin 52 in the circumferential direction CD. Further, the guide hole 60 has a width slightly larger than the diameter of the operation pin 52 in the optical axis direction OAD. The operation pin 52 is inserted into the guide hole 60. The operation pin 52 is moved along the guide hole 60 as the iris ring 15 connected to the operation pin 52 through the guide groove 54 is rotationally operated. That is, the operation pin 52 is operated in the circumferential direction CD.

More exactly, the operation pin 52 is connected to a clip washer (not shown) that holds the plurality of stop leaf blades 51. As the operation pin 52 is operated in the circumferential direction CD, the clip washer is rotated in the circumferential direction CD. The stop leaf blades 51 are operated to be opened and closed by the rotation of the clip washer in the circumferential direction CD.

A pin-movement opening 61 is formed in the outer barrel 32. The pin-movement opening 61 has a size that allows the movement of the operation pin 52 in the circumferential direction CD at the time of adjustment of the opening of the stop aperture and the movement of the operation pin 52 along the optical axis OA caused by the movement of the inner barrel 31 along the optical axis OA at the time of the focus adjustment. That is, the pin-movement opening 61 has a length corresponding to the moving range of the operation pin 52 in the circumferential direction CD as in the case of the guide hole 60. Further, the pin-movement opening 61 has a length corresponding to the moving range of the inner barrel 31 in optical axis direction OAD.

A guide hole 62 is further formed in the outer barrel 32 so as to extend along the optical axis direction OAD. A guide screw 63 is engaged with the guide hole 62. The guide screw 63 is threadedly engaged with a threaded hole 64 formed in the inner barrel 31. The guide hole 62 has a width slightly larger than the diameter of the guide screw 63 in the circumferential direction CD. Further, the guide hole 62 has a length corresponding to the moving range of the inner barrel 31 in the optical axis direction OAD as in the case of the pin-movement opening 61. The movement of the inner barrel 31 along the optical axis OA, which corresponds to the rotational operation of the focus ring 13, is guided by the guide hole 62 and the guide screw 63 in addition to the operation pin 52 and the guide groove 54. Furthermore, the moving range of the inner barrel 31 is restricted by the pin-movement opening 61 and the guide hole 62.

The objective lens OL, the iris ring 15, and the retaining part 16 are not shown in FIGS. 3 and 4 to avoid complexity.

Figure 5:
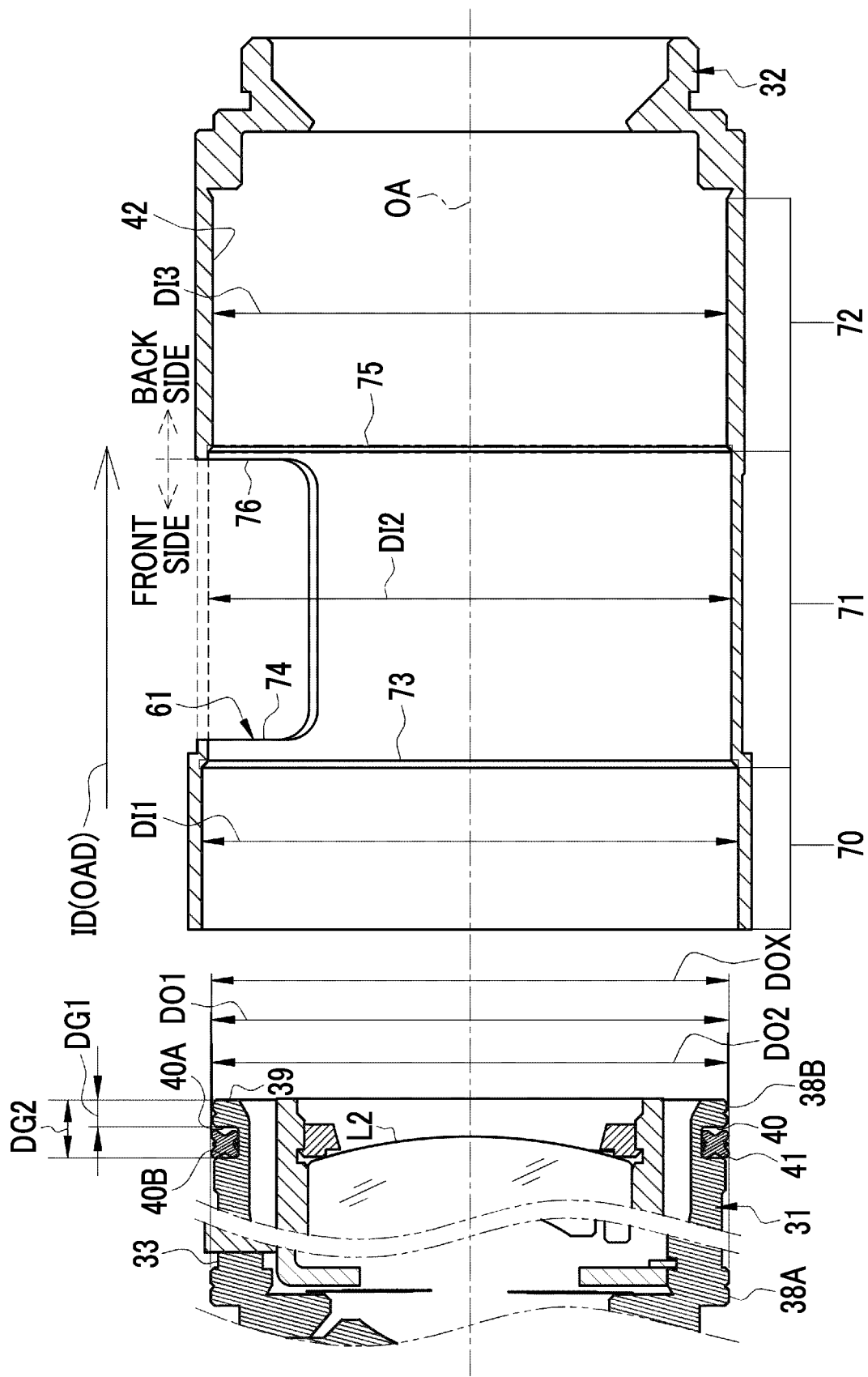
FIG. 5 is an enlarged cross-sectional view showing the respective portions of an inner barrel and an outer barrel.

In FIG. 5, the inner peripheral surface 42 of the outer barrel 32 includes a large-diameter portion 70 corresponding to a second large-diameter portion, a medium-diameter portion 71 corresponding to a second small-diameter portion and a first large-diameter portion, and a small-diameter portion 72 corresponding to the first small-diameter portion. An inner diameter DI1 of the large-diameter portion 70 is larger than an outer diameter DO1 of the first same-diameter portion 38A of the inner barrel 31, an outer diameter DO2 of the second same-diameter portion 38B, and an outer diameter DOX of the X-ring 41 (DI1>DO1, DO2, and DOX).

An inner diameter DI2 of the medium-diameter portion 71 is smaller than the inner diameter DI1 of the large-diameter portion 70 and is larger than an inner diameter DI3 of the small-diameter portion 72 (DH>DI2>DI3). Further, the inner diameter DI2 of the medium-diameter portion 71 is equal to the inner diameter DI1 of the large-diameter portion 70, and is larger than the outer diameter DO1 of the first same-diameter portion 38A of the inner barrel 31, the outer diameter DO2 of the second same-diameter portion 38B, and the outer diameter DOX of the X-ring 41 (DI2>DO1, DO2, and DOX). However, the inner diameter DI2 of the medium-diameter portion 71 is slightly larger than the outer diameter DO1 of the first same-diameter portion 38A, that is, is substantially equal to the outer diameter DO1 of the first same-diameter portion 38A (DI2>DO1).

The inner diameter DI3 of the small-diameter portion 72 is a size that allows the X-ring 41 to be in pressure contact with the small-diameter portion 72 in a case where the inner barrel 31 is inserted into the outer barrel 32 in a state where the X-ring 41 is fitted to the groove 40. More specifically, the inner diameter DI3 of the small-diameter portion 72 is slightly larger than the outer diameter DO2 of the second same-diameter portion 38B, that is, is substantially equal to the outer diameter DO2 of the second same-diameter portion 38B and is smaller than the outer diameter DOX of the X-ring 41 (DO2≈DI3<DOX). The inner diameter of the outer barrel 32 is changed in stages as described above so that the insertion of the inner barrel 31 into the large-diameter portion 70, the medium-diameter portion 71, and the small-diameter portion 72 is smoothly guided all the way.

The large-diameter portion 70 is positioned closest to the front side in the insertion direction ID. The medium-diameter portion 71 is continuous to the large-diameter portion 70, and is positioned on the back side of the large-diameter portion 70 in the insertion direction ID. The small-diameter portion 72 is continuous to the medium-diameter portion 71, and is positioned on the back side of the medium-diameter portion 71 in the insertion direction ID.

A boundary portion 73 between the large-diameter portion 70 and the medium-diameter portion 71 (a boundary portion between the second large-diameter portion and the second small-diameter portion, a portion surrounded by a frame shown by a two-dot chain line) is disposed at a position closer to the front side than an opening edge 74, which is close to the front side, of the pin-movement opening 61. Further, a boundary portion 75 between the medium-diameter portion 71 and the small-diameter portion 72 (a boundary portion between the first large-diameter portion and the first small-diameter portion, a portion surrounded by a frame shown by a two-dot chain line) is disposed at a position closer to the back side than an opening edge 76, which is close to the back side, of the pin-movement opening 61.

The groove 40 to which the X-ring 41 is to be fitted is formed at a position where a distance DG1 in the insertion direction ID between the end portion 39 of the inner barrel 31 and a side wall 40A, which is close to the back side, of the groove 40 is 1 mm or more and a distance DG2 between the end portion 39 and a side wall 40B opposite to the side wall 40A is 5 mm or less.

Figure 6:
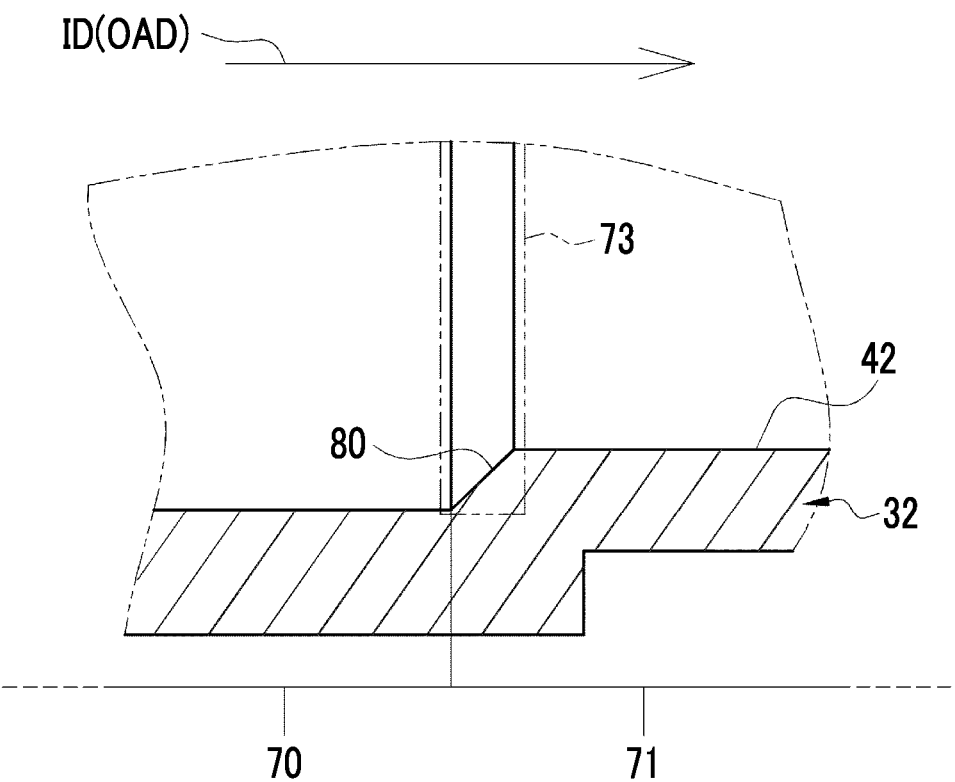
FIG. 6 is an enlarged cross-sectional view showing a boundary portion between a large-diameter portion and a medium-diameter portion.
Figure 7:
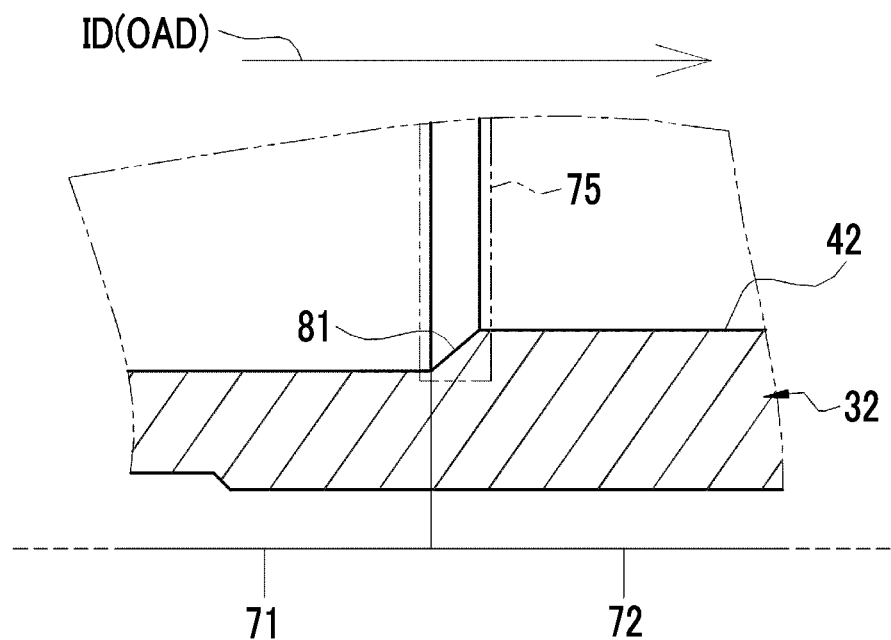
FIG. 7 is an enlarged cross-sectional view showing a boundary portion between the medium-diameter portion and a small-diameter portion.

As shown in FIG. 6, an inclined surface 80 narrowed toward the back side is formed at the boundary portion 73 between the large-diameter portion 70 and the medium-diameter portion 71. Likewise, as shown in FIG. 7, an inclined surface 81 narrowed toward the back side is also formed at the boundary portion 75 between the medium-diameter portion 71 and the small-diameter portion 72. As also known from FIGS. 6 and 7, strictly speaking, the large-diameter portion 70 does not include the boundary portion 73 where the inclined surface 80 is formed. Further, the medium-diameter portion 71 does not include the boundary portion 75 where the inclined surface 81 is formed. The boundary portion 73 is included in the medium-diameter portion 71 and the boundary portion 75 is included in the small-diameter portion 72.

Next, a procedure for assembling the lens unit 11 having the above-mentioned structure will be described. First, optical components, such as the lenses L1 and L2 and the stop leaf blades 51, are mounted in the inner barrel 31. Then, the X-ring 41 is fitted to the groove 40. More specifically, a part of the X-ring 41 is caught in the groove 40. Then, while pressing a part of the caught X-ring 41 with a finger, a user stretches the other part of the X-ring 41 a little and puts the other part of the X-ring 41 in the groove 40 over the end portion 39.

In this case, since the groove 40 is formed at the position where the distance DG1 in the insertion direction ID between the end portion 39 of the inner barrel 31 and the side wall 40A close to the back side is 1 mm or more and the distance DG2 between the end portion 39 and the side wall 40B opposite to the side wall 40A close to the back side is 5 mm or less as shown in FIG. 5, the X-ring 41 can be easily fitted to the groove 40.

That is, in the case of a position where the distance DG1 is shorter than 1 mm, it is difficult to machine the groove 40. On the other hand, in the case of a position where the distance DG2 is longer than 5 mm, the X-ring 41 needs to be stretched significantly. For this reason, time and effort are required to fit the X-ring 41 to the groove 40. Further, since the X-ring 41 is stretched significantly, there is a concern that damage, such as a crack, may occur on the X-ring 41. Since the groove 40 is formed at the position where the distance DG1 in the insertion direction ID between the end portion 39 of the inner barrel 31 and the side wall 40A close to the back side is 1 mm or more and the distance DG2 between the end portion 39 and the side wall 40B opposite to the side wall 40A close to the back side is 5 mm or less, such a trouble can be solved.

After the X-ring 41 is fitted to the groove 40, the coil spring 37 is inserted into the inner barrel 31. Then, the inner barrel 31 is inserted into the outer barrel 32 along the insertion direction ID in this state. As the inner barrel 31 is inserted into the outer barrel 32 along the insertion direction ID, the inner barrel 31 passes through the large-diameter portion 70, the medium-diameter portion 71, and the small-diameter portion 72 in this order.

As shown in FIG. 5, the inner diameter DI1 of the large-diameter portion 70 and the inner diameter DI2 of the medium-diameter portion 71 are larger than the outer diameter DO1 of the first same-diameter portion 38A of the inner barrel 31, the outer diameter DO2 of the second same-diameter portion 38B, and the outer diameter DOX of the X-ring 41. Further, the inner diameter DI2 of the medium-diameter portion 71 is smaller than the inner diameter DI1 of the large-diameter portion 70. Furthermore, the inclined surface 80 narrowed toward the back side is formed at the boundary portion 73 between the large-diameter portion 70 and the medium-diameter portion 71 as shown in FIG. 6. Accordingly, the inner barrel 31 can smoothly pass toward the medium-diameter portion 71 from the large-diameter portion 70 with almost no resistance.

The inner barrel 31 having passed through the medium-diameter portion 71 reaches the small-diameter portion 72, and passes through the boundary portion 75 between the medium-diameter portion 71 and the small-diameter portion 72. As shown in FIG. 5, the inner diameter DI3 of the small-diameter portion 72 is smaller than the outer diameter DOX of the X-ring 41. For this reason, the X-ring 41 is in pressure contact with the small-diameter portion 72. Accordingly, the rattling of the inner barrel 31 caused by the gap between the outer peripheral surface 33 of the inner barrel 31 and the inner peripheral surface 42 of the outer barrel 32 is absorbed.

Further, since the boundary portion 75 between the medium-diameter portion 71 and the small-diameter portion 72 is disposed at a position closer to the back side than the opening edge 76, which is close to the back side, of the pin-movement opening 61 as shown in FIG. 5, the X-ring 41 does not protrude from the pin-movement opening 61 and is not taken out of the groove 40 in a case where the inner barrel 31 passes through the boundary portion 75 between the medium-diameter portion 71 and the small-diameter portion 72.

An action, which is obtained in a case where the boundary portion 75 between the medium-diameter portion 71 and the small-diameter portion 72 is disposed at a position closer to the back side than the opening edge 76, which is close to the back side, of the pin-movement opening 61, will be described in detail below using Comparative example shown in FIGS. 8A, 8B, and 9.

Figure 8B:
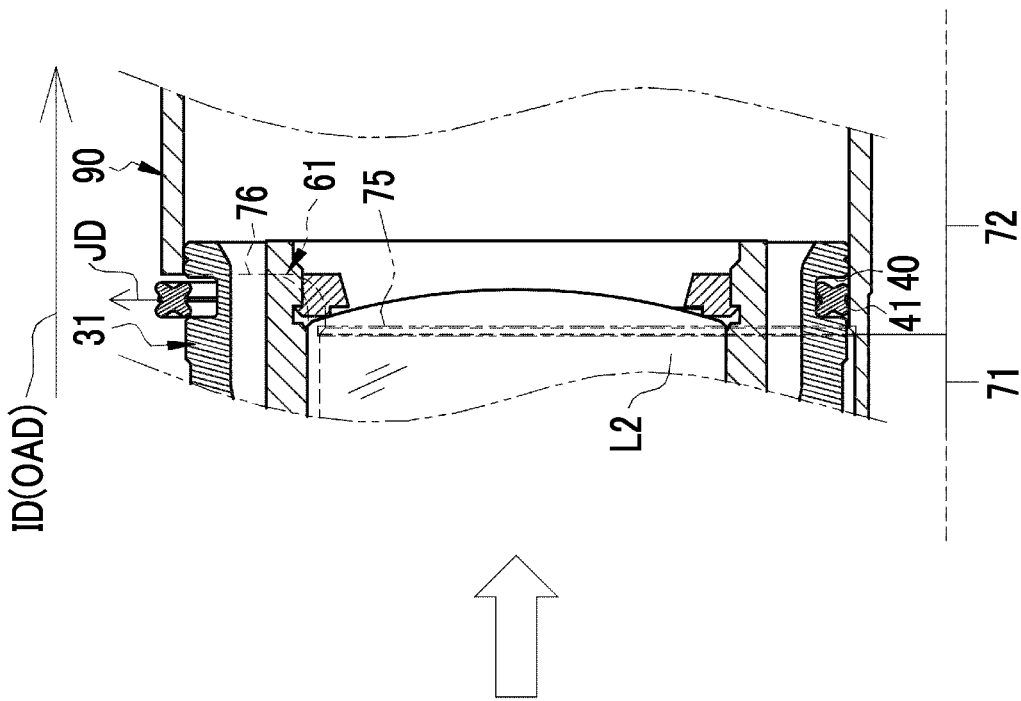
FIGS. 8A and 8B are diagrams showing an outer barrel of Comparative example of which a boundary portion between a medium-diameter portion and a small-diameter portion is disposed at a position closer to a front side than an opening edge, which is close to a back side, of a pin-movement opening.
Figure 8A:
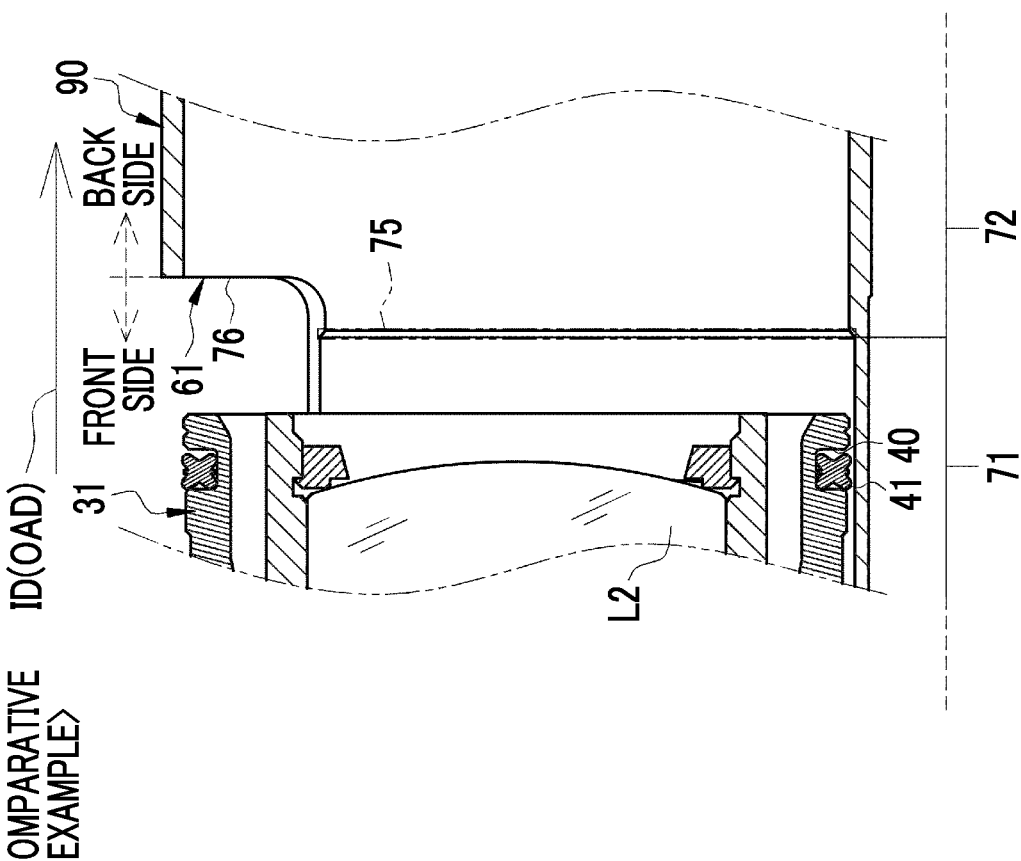

FIGS. 8A and 8B show an outer barrel 90 where the boundary portion 75 between the medium-diameter portion 71 and the small-diameter portion 72 is disposed at a position closer to the front side than the opening edge 76, which is close to the back side, of the pin-movement opening 61 on the contrary to the embodiment of the invention. FIG. 8A shows a state where the inner barrel 31 is about to pass through the boundary portion 75. On the other hand, FIG. 8B shows a state where the inner barrel 31 is further pushed in the insertion direction ID from the state of FIG. 8A and the X-ring 41 has passed through the boundary portion 75. FIG. 9 is a partial cross-sectional view showing the state of FIG. 8B as seen from the front side in the insertion direction ID.

Figure 9:
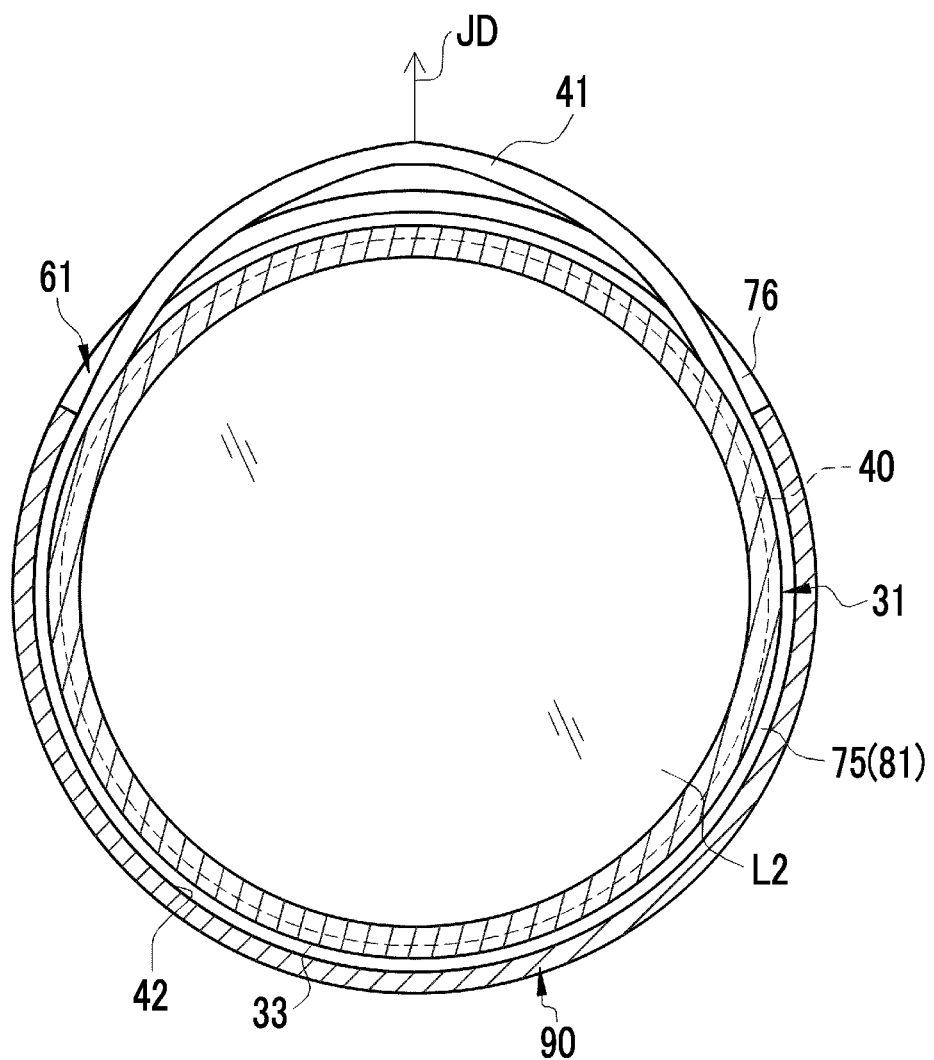
FIG. 9 is a partial cross-sectional view showing the state of FIG. 8B as seen from the front side in an insertion direction.

In the state shown in FIGS. 8B and 9, a large portion of the X-ring 41 is in pressure contact with the small-diameter portion 72. However, a portion of the X-ring 41 facing the pin-movement opening 61 is not in pressure contact with the small-diameter portion 72 since the pin-movement opening 61 is open upward. Further, a large portion of the other portion of the X-ring 41 is in pressure contact with the small-diameter portion 72. For this reason, the portion of the X-ring 41 facing the pin-movement opening 61 protrudes in an arrow direction JD, is taken out of the groove 40, and is caught by the opening edge 76, which is close to the back side, of the pin-movement opening 61.

Figure 10B:
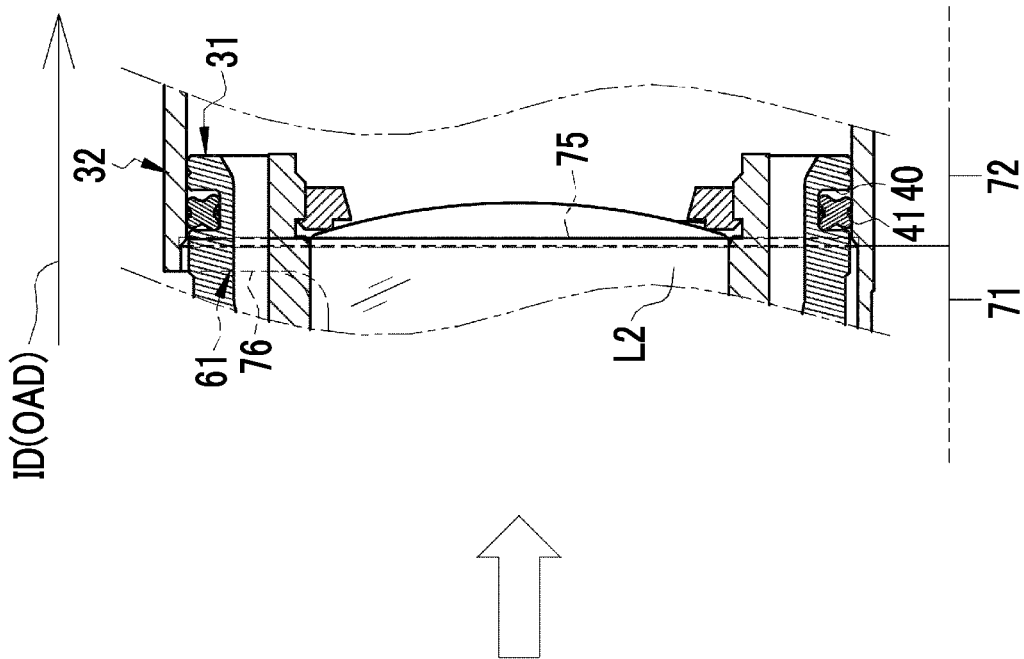
FIGS. 10A and 10B show a case where a boundary portion between a medium-diameter portion and a small-diameter portion is disposed at a position closer to a back side than an opening edge, which is close to the back side, of a pin-movement opening.
Figure 10A:
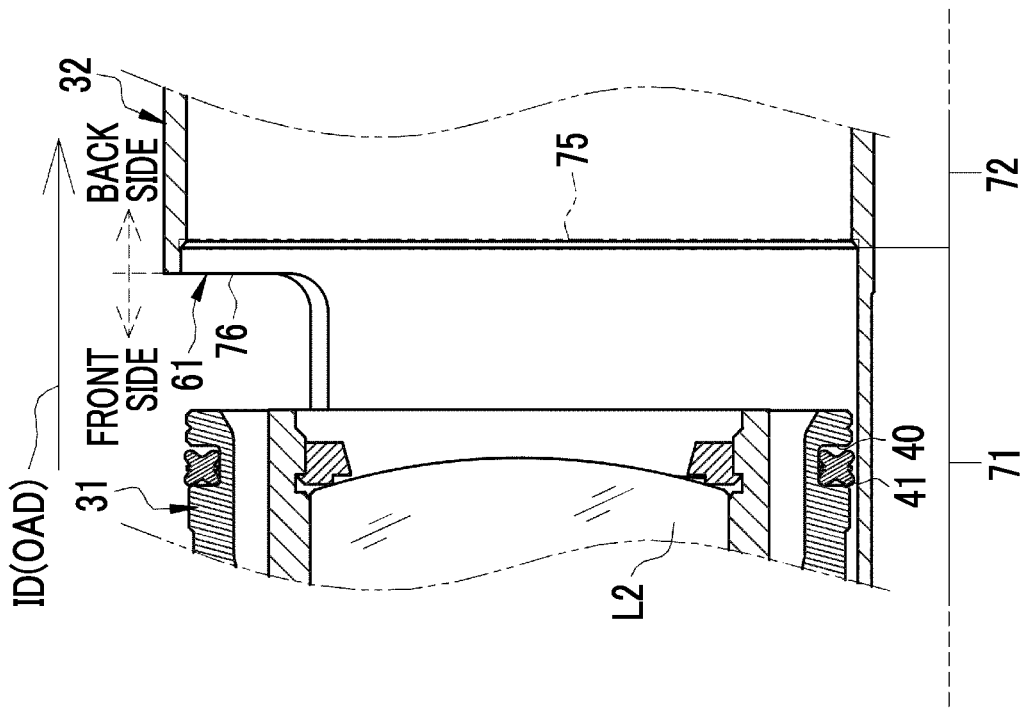

In contrast, in the embodiment of the invention, the boundary portion 75 between the medium-diameter portion 71 and the small-diameter portion 72 is disposed at a position closer to the back side than the opening edge 76, which is close to the back side, of the pin-movement opening 61 as shown in FIG. 10A showing a state where the inner barrel 31 is about to pass through the boundary portion 75 and FIG. 10B showing a state where the X-ring 41 has passed through the boundary portion 75. Accordingly, the entire X-ring 41 is in pressure contact with the small-diameter portion 72 at substantially the same time. For this reason, a situation where a large portion of the X-ring 41 is in pressure contact with the small-diameter portion 72 and only a portion of the X-ring 41 facing the pin-movement opening 61 is not pressure contact with the small-diameter portion 72 as in Comparative example shown in FIGS. 8A and 8B cannot occur. Accordingly, since a case where the X-ring 41 protrudes from the pin-movement opening 61 and is taken out of the groove 40 is prevented, the inner barrel 31 can be easily assembled with the outer barrel 32.

Further, since the inclined surface 81 narrowed toward the back side is formed at the boundary portion 75 between the medium-diameter portion 71 and the small-diameter portion 72 as shown in FIG. 7, the inner barrel 31 can smoothly pass toward the small-diameter portion 72 from the medium-diameter portion 71 with almost no resistance.

After the inner barrel 31 is inserted into the outer barrel 32, the operation pin 52 is mounted on the stop leaf blades 51 through the pin-movement opening 61 and the guide hole 60. Further, the guide screw 63 is threadedly engaged with the threaded hole 64 through the guide hole 62. Furthermore, the male threads 34 of the inner barrel 31 are threadedly engaged with the female threads 36 of the focus ring 13 where the objective lens OL is mounted, so that a state shown in FIG. 3 is made.

After the state shown in FIG. 3 is made, annular members, such as the iris ring 15 and the retaining part 16, are inserted into the outer barrel 32 from the side opposite to the focus ring 13 in this order. Then, the fixing screw 19 is tightened to fix the retaining part 16 to the outer barrel 32. Finally, the fixing screw 17 is mounted on the outer barrel 32, and the fixing screw 18 is mounted on the iris ring 15. As a result, the lens unit 11 is completed.

In a case where the lens unit 11 is to be used for a machine vision camera 10, a user mounts the lens unit 11 on the camera body 12 first. Then, the user loosens the fixing screw 17, rotationally operates the focus ring 13, and performs focus adjustment. Further, the user loosens the fixing screw 18, rotationally operates the iris ring 15, and adjusts the opening of the stop aperture. The user performs the focus adjustment and the adjustment of the opening of the stop aperture while checking a subject image, which is captured by the lens unit 11 and is picked up by the image sensor of the camera body 12, on a monitor of the information processing device, or the like. After the focus adjustment and the adjustment of the opening of the stop aperture, the user tightens the fixing screws 17 and 18 to fix the focus ring 13 and the iris ring 15.

Second Embodiment

In an outer barrel 95 of a second embodiment shown in FIG. 11, the boundary portion 75 between the medium-diameter portion 71 and the small-diameter portion 72 is disposed at the same position as the opening edge 76, which is close to the back side, of the pin-movement opening 61. Since a case where the X-ring 41 protrudes from the pin-movement opening 61 and is taken out of the groove 40 is prevented as in the first embodiment even by the outer barrel 95, the inner barrel 31 can be easily assembled with the outer barrel 90.

The large-diameter portion 70 may be eliminated and only two diameter portions of the medium-diameter portion 71 and the small-diameter portion 72 may be provided. In this case, the medium-diameter portion 71 corresponds to the first large-diameter portion and the second large-diameter portion and the small-diameter portion 72 corresponds to the first small-diameter portion and the second small-diameter portion. Alternatively, a diameter may be changed in three stages so that four or more portions having different diameters are provided.

An O-ring of which the cross-sectional shape taken in a direction orthogonal to the circumferential direction CD is an O shape (circular shape) may be used as an elastic ring instead of the X-ring 41.

However, the contact area of the O-ring to be in contact with the pressure contact surface (here, the inner peripheral surface of the small-diameter portion 72) is larger than that of the X-ring 41, and the frictional resistance of the O-ring against the pressure contact surface is larger as that much. For this reason, there is a concern that the frictional resistance of the O-ring may be too large and may hinder the movement of the inner barrel 31 along the optical axis OA. In contrast, in the case of the X-ring 41, the rattling of the inner barrel 31 is absorbed and the inner barrel 31 can be moved along the optical axis OA with almost no resistance. Accordingly, it is preferable that the X-ring 41 is used as the elastic ring.

It goes without saying that the invention is not limited to the respective embodiments having been described above and can employ various structures without departing from the scope of the invention. For example, the invention can also be applied to a lens unit used for, for example, a general-purpose digital camera other than the machine vision camera 10. Further, the invention can also be applied to a lens unit on which a projection optical system of a projector is mounted.

EXPLANATION OF REFERENCES

10: machine vision camera
11: lens unit
12: camera body
3: focus ring
15: iris ring
16: retaining part
17 to 19: fixing screw
30: focus mechanism
31: inner barrel
32, 90, 95: outer barrel
33: outer peripheral surface of inner barrel
34: male thread
35: inner peripheral surface of focus ring
36: female thread
37: coil spring
38A, 38B: first and second same-diameter portions
39: end portion of inner barrel
40: groove
40A: side wall close to back side
40B: side wall opposite to side wall close to back side
41: X-ring (elastic ring)
42: inner peripheral surface of outer barrel
50: stop mechanism
51: stop leaf blades
52: operation pin
53: inner peripheral surface of iris ring
54: guide groove
60: guide hole
61: pin-movement opening
62: guide hole
63: guide screw
64: threaded hole
70: large-diameter portion (second large-diameter portion)
71: medium-diameter portion (second small-diameter portion and first large-diameter portion)
72: small-diameter portion (first small-diameter portion)
73: boundary portion between large-diameter portion medium-diameter portion
74: opening edge, which is close to front side, of pin-movement opening
75: boundary portion between medium-diameter portion and small-diameter portion
76: opening edge, which is close to back side, of pin-movement opening
80, 81: inclined surface
OA: optical axis
ID: insertion direction
OAD: optical axis direction
CD: circumferential direction
OL: objective lens
L1, L2: lens
DO1: outer diameter of first same-diameter portion
DO2: outer diameter of second same-diameter portion
DOX: outer diameter of X-ring
DI1: inner diameter of large-diameter portion
DI2: inner diameter of medium-diameter portion
DI3: inner diameter of small-diameter portion
DG1: distance in insertion direction between end portion of inner barrel and side wall, which is close to back side, of groove
DG2: distance in insertion direction between end portion of inner barrel and side wall opposite to side wall, which is close to back side, of groove
JD: protruding direction of X-ring

What is claimed is:

1. A lens unit comprising:
a focus mechanism including an inner barrel that holds a plurality of lenses and an outer barrel into which the inner barrel is inserted and which holds the inner barrel to allow the inner barrel to move along an optical axis of the lenses;
a stop mechanism including a stop leaf blade that limits the amount of light and an operation pin that protrudes outward from the stop leaf blade and is operated in a circumferential direction to adjust an opening of the stop leaf blade;
an annular groove that is formed on an outer peripheral surface of the inner barrel along the circumferential direction;
an elastic ring that is fitted to the groove, and is in pressure contact with an inner peripheral surface of the outer barrel and absorbs rattling of the inner barrel caused by a gap between the outer peripheral surface of the inner barrel and the inner peripheral surface of the outer barrel in a case where the inner barrel is assembled with the outer barrel; and
a pin-movement opening that is formed in the outer barrel and has a size allowing movement of the operation pin in the circumferential direction and movement of the operation pin along the optical axis caused by movement of the inner barrel along the optical axis,
wherein the inner peripheral surface of the outer barrel includes at least a first large-diameter portion that has an inner diameter larger than an outer diameter of the inner barrel, and a first small-diameter portion that is continuous to the first large-diameter portion, is positioned on a back side of the first large-diameter portion in an insertion direction where the inner barrel is inserted into the outer barrel, and has an inner diameter allowing the elastic ring to be in pressure contact with the first small-diameter portion in a case where the inner barrel is inserted into the outer barrel in a state where the elastic ring is fitted to the groove, and
a boundary portion between the first large-diameter portion and the first small-diameter portion is disposed at the same position as an opening edge, which is close to the back side, of the pin-movement opening or a position closer to the back side than the opening edge.

2. The lens unit according to claim 1,
wherein the inner peripheral surface of the outer barrel includes a second large-diameter portion that has an inner diameter larger than the outer diameter of the inner barrel, and a second small-diameter portion that is continuous to the second large-diameter portion, is positioned on the back side of the second large-diameter portion, and has an inner diameter smaller than the inner diameter of the second large-diameter portion, and
an inclined surface narrowed toward the back side is formed at a boundary portion between the second large-diameter portion and the second small-diameter portion.

3. The lens unit according to claim 1,
wherein the groove is formed at a position where a distance in the insertion direction between an end portion of the inner barrel and a side wall, which is close to the back side, of the groove is 1 mm or more and a distance between the end portion and a side wall of the groove opposite to the side wall close to the back side is 5 mm or less.

4. The lens unit according to claim 1, wherein the elastic ring is an X-ring of which a cross-sectional shape taken in a direction orthogonal to the circumferential direction is an X shape.

5. The lens unit according to claim 1, wherein the lens unit is used for a machine vision camera.

6. A lens unit comprising:

a focus mechanism including an inner barrel that holds a plurality of lenses and an outer barrel into which the inner barrel is inserted and which holds the inner barrel to allow the inner barrel to move along an optical axis of the lenses;

a stop mechanism including a stop leaf blade that limits the amount of light and an operation pin that protrudes outward from the stop leaf blade and is operated in a circumferential direction to adjust an opening of the stop leaf blade;

an annular groove that is formed on an outer peripheral surface of the inner barrel along the circumferential direction;

an elastic ring that is fitted to the groove, and is in pressure contact with an inner peripheral surface of the outer barrel and absorbs rattling of the inner barrel caused by a gap between the outer peripheral surface of the inner barrel and the inner peripheral surface of the outer barrel in a case where the inner barrel is assembled with the outer barrel; and a pin-movement opening that is formed in the outer barrel and has a size allowing movement of the operation pin in the circumferential direction and movement of the operation pin along the optical axis caused by movement of the inner barrel along the optical axis, the inner peripheral surface of the outer barrel includes a second large-diameter portion that has an inner diameter larger than an outer diameter of the inner barrel, and a second small-diameter portion that is continuous to the second large-diameter portion, is positioned on a back side of the second large-diameter portion, and has an inner diameter smaller than the inner diameter of the second large-diameter portion, and an inclined surface narrowed toward the back side is formed at a boundary portion between the second large-diameter portion and the second small-diameter portion.

7. The lens unit according to claim 1, wherein the groove is formed at a position where a distance in the insertion direction between an end portion of the inner barrel and a side wall, which is close to the back side, of the groove is 1 mm or more and a distance between the end portion and a side wall of the groove opposite to the side wall close to the back side is 5 mm or less.

8. The lens unit according to claim 1, wherein the elastic ring is an X-ring of which a cross-sectional shape taken in a direction orthogonal to the circumferential direction is an X shape.

9. The lens unit according to claim 1, wherein the lens unit is used for a machine vision camera.

* * * * *